United States Patent
Maa et al.

(10) Patent No.: US 10,118,170 B1
(45) Date of Patent: Nov. 6, 2018

(54) ANTI-BACTERIAL LIGHTING APPARATUS

(71) Applicant: Aleddra Inc., Renton, WA (US)

(72) Inventors: Chia-Yiu Maa, Bellevue, WA (US); Chun-Te Yu, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 15/865,621

(22) Filed: Jan. 9, 2018

(51) Int. Cl.
| | | |
|---|---|---|
| *B01J 35/00* | (2006.01) | |
| *B01J 23/50* | (2006.01) | |
| *H05B 33/08* | (2006.01) | |
| *B01J 21/06* | (2006.01) | |
| *F21V 3/04* | (2018.01) | |

(52) U.S. Cl.
CPC ............ *B01J 35/004* (2013.01); *B01J 21/063* (2013.01); *B01J 23/50* (2013.01); *F21V 3/04* (2013.01); *H05B 33/0803* (2013.01)

(58) Field of Classification Search
CPC ............................ B01J 35/004; H05B 33/0803
See application file for complete search history.

(56) References Cited

U.S. PATENT DOCUMENTS

| | | | | |
|---|---|---|---|---|
| 6,242,752 B1* | 6/2001 | Soma | ...................... | H01J 61/35 250/504 R |
| 9,522,384 B2* | 12/2016 | Lu | ............................ | B01J 23/50 |
| 2011/0212410 A1* | 9/2011 | Fiset | .................... | A61C 19/066 433/29 |
| 2015/0151015 A1* | 6/2015 | Bugenske | ............. | B29D 11/00 422/24 |

* cited by examiner

*Primary Examiner* — Joseph L Williams
(74) *Attorney, Agent, or Firm* — Han IP PLLC; Andy M. Han

(57) ABSTRACT

A lighting apparatus that includes at least one light source and at least one transparent or translucent lens, and at least one anti-bacterial composite film. The anti-bacterial composite film that includes photocatalytic particles and nano silver particles is formed on at least a part of the outer surface of the lens. With this anti-bacterial composite film, the lighting apparatus retains its germicidal function when the light source is turned off. Moreover, at least 95% of the spectral power distribution (SPD) of the light source comes from the visible light wavelength range (>400 nm). Artificial light sources such as LED can also be used with the anti-bacterial lighting apparatus.

5 Claims, 6 Drawing Sheets

| Test Organism: | *Staphylococcus aureus* | ATCC 6538P | |
|---|---|---|---|
| Test Group | CFU/cm² | LOG | Antibacterial activity (R) |
| Control test piece at 0h ($U_o$) | $1.5 \times 10^4$ | 4.17 | |
| Control test piece after 24h ($U_t$) | $2.1 \times 10^4$ | 4.32 | >4.52 |
| Test piece after 24h ($A_t$) | <0.63 | -0.20 | |

| Test Organism: | *Escherichia coli* | ATCC 8739 | |
|---|---|---|---|
| Test Group | CFU/cm² | LOG | Antibacterial activity (R) |
| Control test piece at 0h ($U_o$) | $2.1 \times 10^4$ | 4.32 | |
| Control test piece after 24h ($U_t$) | $9.8 \times 10^5$ | 5.99 | >6.19 |
| Test piece after 24h ($A_t$) | <0.63 | -0.20 | |

Table 1

FIG. 3

ANTI-BACTERIAL LIGHTING APPARATUS

BACKGROUND

Technical Field

The present disclosure pertains to the field of lighting devices and, more specifically, proposes an anti-bacterial lighting apparatus.

Description of Related Art

Photocatalysts are known to become active under ultraviolet light and kill bacteria by breaking down the cell wall of the bacteria. Soma, R., et al., in U.S. Pat. No. 6,242,752 teaches the use of a photocatalytic film made of anatase-type titanium oxide ($TiO_2$) on the lens of a lighting device such that, as the light originating from the lighting device shines through the titanium oxide film, the UV rays of the light activate the photocatalyst, causing it to break down the bacteria cell wall and resulting in the killing of the bacteria. One main limitation of this anti-bacterial lighting device is that the germicidal operation can only take place when there is light shining through the photocatalytic film. When the light is turned off, the fixtures render no anti-bacterial benefit.

Another issue that necessitates a closer inspection of the lighting device by Soma, R., et al. is the effectiveness of the anatase-type titanium oxide. In U.S. Pat. No. 9,522,384, Liu L. et al. explained that the particles of anatase-type titanium oxide may be of two shapes: sphere and rhombus. The sphere-shape particle is larger, whereas the rhombus-shape particle is smaller, meaning that the latter has a higher density per unit of volume and therefore a much higher photocatalytic bacteria-killing effect than that of the former. This means that for an anatase-type titanium oxide film of a given thickness, it would take much less UV ray spectral power for the rhombus-shape particle to generate the same amount of germicidal effect as compared to the amount of UV ray spectral power required by the sphere-shape particles. Soma, R., et al., in U.S. Pat. No. 6,242,752 did not address the difference in the photocatalytic effectiveness of different particle shapes of the anatase-type titanium oxide, nor the differing amounts of UV light spectral power as needed by the different particles shapes of the anatase-type titanium oxide for generating the same photocatalytic germicidal effect.

In FIG. 1, the spectral power distribution (SPD) of different light sources are shown. From the SPC curves, it can be observed that daylight contains significant UV ray power (for rays with wavelength less than 400 nm), whereas artificial light sources have significantly less UV ray power. Most notably, the LED light source exhibits nearly no UV ray power. When taking the UV ray power of different light sources into consideration, it can be argued that for anatase titanium oxide film of a given thickness, the photocatalytic germicidal effect would differ depending on the light source. In other words, in order to produce the desirable photocatalytic germicidal effect on a given thickness of the anatase titanium oxide film, the issue lies not in whether the light that shines through the film contains UV rays or not, but rather in the UV SPD of the light source. Soma, R., et al., in U.S. Pat. No. 6,242,752 did not address the UV SPD requirement for the light source.

The present disclosure presents an anti-bacterial lighting apparatus that makes use of the new photocatalytic composite material invented by Liu, L. et al. in U.S. Pat. No. 9,522,384, thus overcoming the main limitation of the design of Soma, R., et al., in U.S. Pat. No. 6,242,752, and sets the UV SPD requirements for the light source, thus advancing the teaching of Soma, R., et al., in U.S. Pat. No. 6,242,752.

SUMMARY

In one aspect, the lighting apparatus comprises at least one light source, at least one transparent or translucent lens, and at least one anti-bacterial composite film. The lens covers the light source partially or completely. The anti-bacterial composite film that comprises photocatalytic particles and nano silver particles is formed on at least a part of the outer surface of the lens. Moreover, the spectral power (SPD) of the UV ray components of the lighting source is between zero and 5% of the total SPD of the light source. In some embodiments, the photocatalytic particle is rhombus-shape anatase-type titanium oxide ($TiO_2$).

Silver ions are known of having an antimicrobial effect and are not affected by light, since they are not a photocatalytic material. Using an anti-bacterial composite of photocatalytic particles and nano silver particles on the outer surface of the lens of the lighting device provides the bacteria killing function even when the light source of the lighting device is turned off, since the sliver particles are still active in germicidal function, thus overcoming the main limitation of Soma, R., et al., in U.S. Pat. No. 6,242,752, where the anti-bacterial function becomes inactive when the light source is off. When the light source is turned on, both rhombus-shape anatase-type titanium oxide ($TiO_2$) particles and nano silver particles are active, thus greatly enhancing the germicidal effectiveness of the device.

According to FIG. 1, the spectral power of UV component of daylight is between 5-10% of the total spectral power of daylight. For most artificial light sources, the spectral power of their UV components is between 0-5% of the total spectral power of the light sources. To verify the antibacterial effectiveness of using an artificial light with a spectral power of UV components of less than 5% of the total spectral power of the light source, the following test was conducted. A blank polycarbonate lens and another polycarbonate lens coated with an anti-bacterial composite film of rhombus-shape anatase-type titanium oxide ($TiO_2$) particles and nano silver particles were tested according to the JIS Z 2801 Test for Antimicrobial Activity of Plastics (http://microchemlab.com/test/jis-z-2801-test-antimicrobial-activity-plastics).

The test was conducted over a 24-hour period in a normal test lab setting, illuminated by typical linear troffer luminaires with linear fluorescent tubular lamps set at a 12-hour-on and 12-hour-off operation cycle. The specimen lens was placed on the lab table at an estimated distance of 10 feet from the linear troffer luminaires on the ceiling. The results are shown in Table 1 in FIG. 3, and some relevant remarks are listed below:

$U_o$: Untreated test piece at 0 h, bacteria counts should be at $6.2 \times 10^3$ to $2.5 \times 10^4$ $CFU/cm^2$ $U_t$: Untreated test piece after 24 h $A_t$: Antibacterial test piece after 24 h Antibacterial Activity $R(log)=U_t-A_t$; R shall be $\geq 2$ for Antibacterial effectiveness.

The test sample (a PC lens coated with an anti-bacterial composite film of rhombus-shape anatase-type titanium oxide particles and nano silver particles) shows an Antibacterial Activity (R)>4.52 for *Staphylococcus Aureus* bacteria and an Antibacterial Activity (R)>6.19 for *Escherichia Coli* bacteria. The test was conducted under a regular fluorescent light source, where the spectral power of its UV components is less than 5% of the total spectral power of the light source.

Among commonly seen artificial light sources, LED exhibits the lowest percentage of UV spectral power. However, the UV spectral power of white LED for general lighting is not zero, unless it is a special made UV-free LED. An enlarged view of the SPD of a typical white LED is shown in FIG. 2. A closer look at the SPD curve reveals there are residual UV rays below 400 nm. Even though the percentage of these residual UV rays may be less than 1% of the total spectral power of the light emitted by the LED, their presence could nonetheless activate the photocatalytic particles in the anti-bacterial composite film on the lens. The UV wavelengths do not center at 365 nm (a restriction taught by Soma, R., et al., in U.S. Pat. No. 6,242,752), rather they are more spread out. White LED can thus leverage the anti-bacterial effect of rhombus-shape anatase-type titanium oxide.

Is it practical to use a LED light source with an anti-bacterial composite film coating on a lens for the intended anti-bacteria function, given its small percentage of UV spectral power? The answer is three-fold. Firstly, the nano silver particles are active in killing bacteria at all times, regardless of the presence of any light or the percentage of the UV component of the light source. Secondly, the light intensity is inversely proportional to the square of the distance between the lens and light source ($1/R^2$, where R is the distance from the light source). It is observed that the general distance between the lens and the LED light source is 0.25" (as with LED light bulb) to 6" (as with LED light fixtures). The UV spectral power of the LED light source may be less than 1% of the total spectral power. However, the 6" spacing between the lens and the LED source is $\frac{1}{20}$ of the estimated distance (10 ft) between the lens sample and the linear fluorescent troffers of the stated JIS Z 2801 Test above. Thus, a lens positioned at 6" from the light source will receive $20 \times 20 = 400$ times the light intensity of a lens positioned 10 ft away from the light source, implying a proportionally stronger UV spectral power at 6" than at 10 ft. Thirdly, the rhombus-shape anatase-type titanium oxide particles are highly active when exposed to UV light, and the density of the $TiO_2$ particles counts more than the percentage of the UV spectral power because there is a continuous, unlimited supply of UV rays when the LED light source is turned on. When all of these factors are considered, it is practical to use a LED light source in close proximity (1 ft or less) with a lens coated with an anti-bacterial composite film of rhombus-shape anatase-type titanium oxide particles and nano silver particles for achieving effective germicidal irradiation. Therefore, in some embodiments of the present disclosure, at least one light source is made of LED (light emitting diode).

The coating of the composite film will have the inevitable effect of reducing the light level passing through the lens. To maintain the illumination function of the lighting apparatus, in some embodiments, the thickness of the anti-bacterial composite film is limited to be less than 200 nm, and in some other embodiments, the overall light transmittance of the anti-bacterial composite film is kept to be greater than 90%. However, it is foreseeable that specialty lighting devices designed primarily for bacteria killing may employ a thicker anti-bacterial composite film of photocatalytic particles and nano silver particles, or an anti-bacterial composite film with a lower transmittance, or both.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

FIG. 3 contains a table showing experimental results.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration. For example, the various concepts discussed herein may be suitably implemented in a variety of lighting apparatuses having different form factors.

The present disclosure discloses a lighting apparatus that comprises at least one light source and at least one transparent or translucent lens. The lens covers the light source partially or completely. An anti-bacterial composite film that comprises photocatalytic particles and nano silver particles is formed on at least a part of the outer surface of the lens. Moreover, the spectral power (SPD) of the UV ray components of the lighting source is between 0-5% of the total SPD of the light source.

Example Implementations

Figure 1:
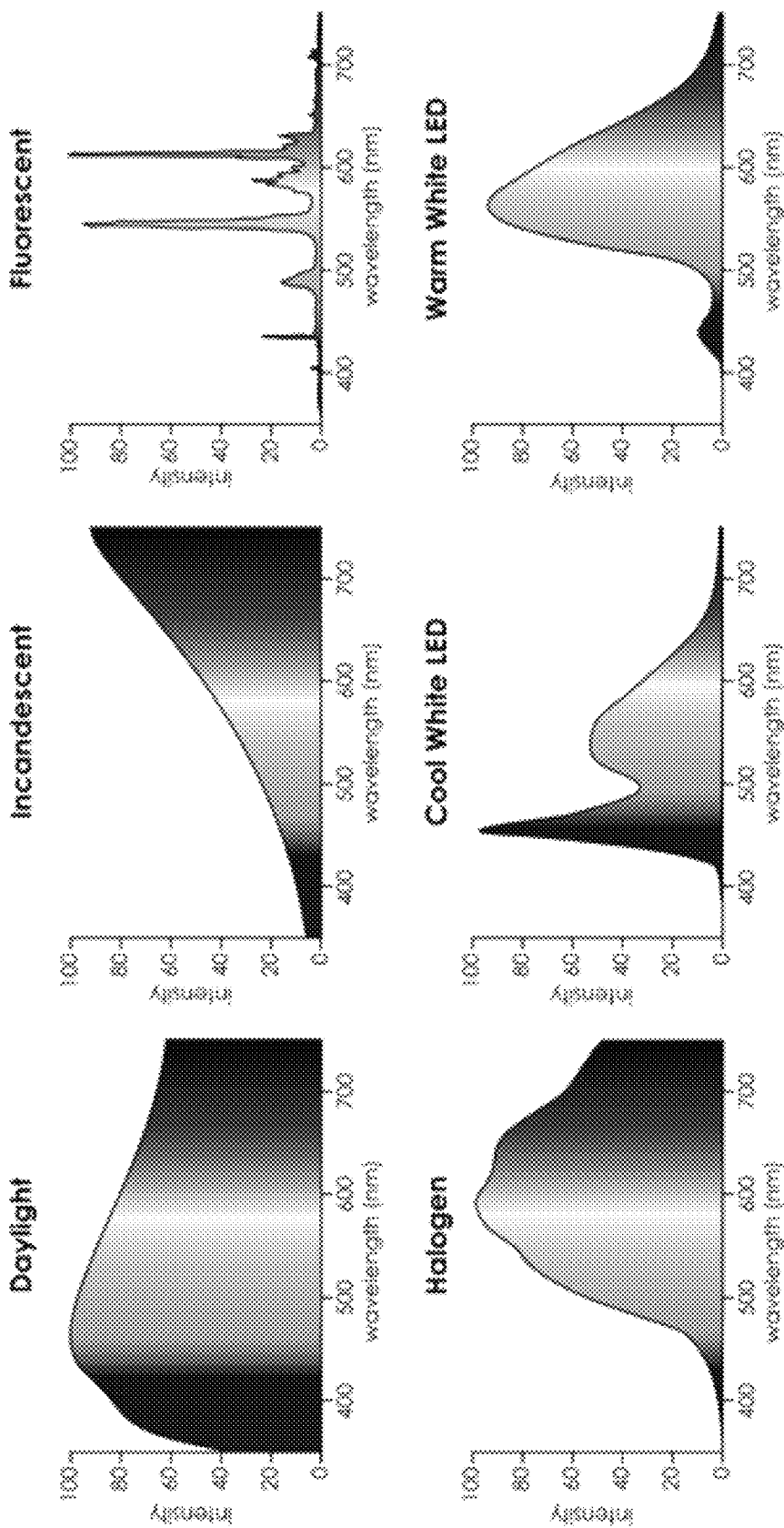
FIG. 1 shows the spectral power distribution (SPD) of different light sources.
Figure 2:
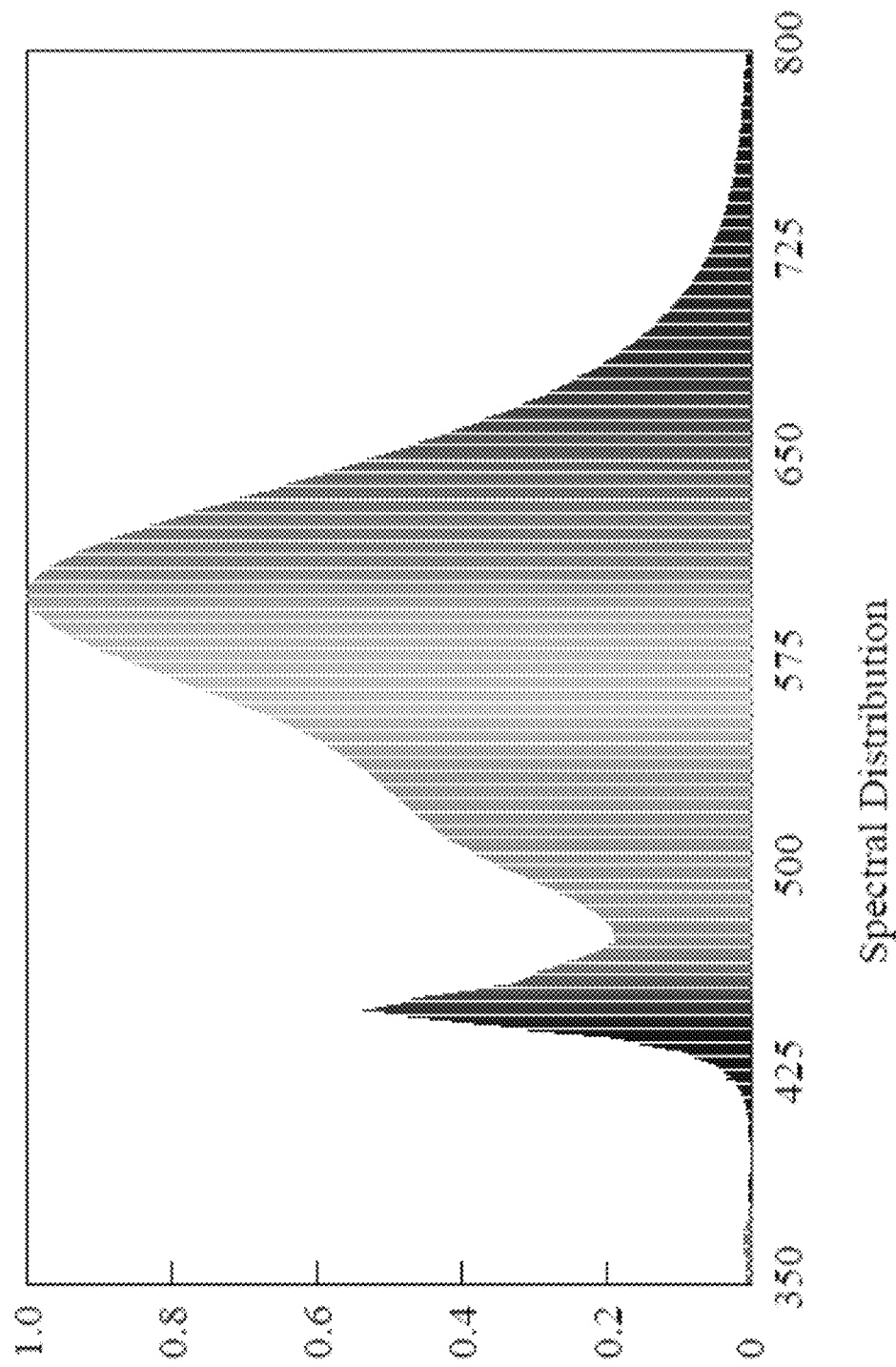
FIG. 2 shows an enlarged view of the SPD of a typical white LED.
Figure 4:
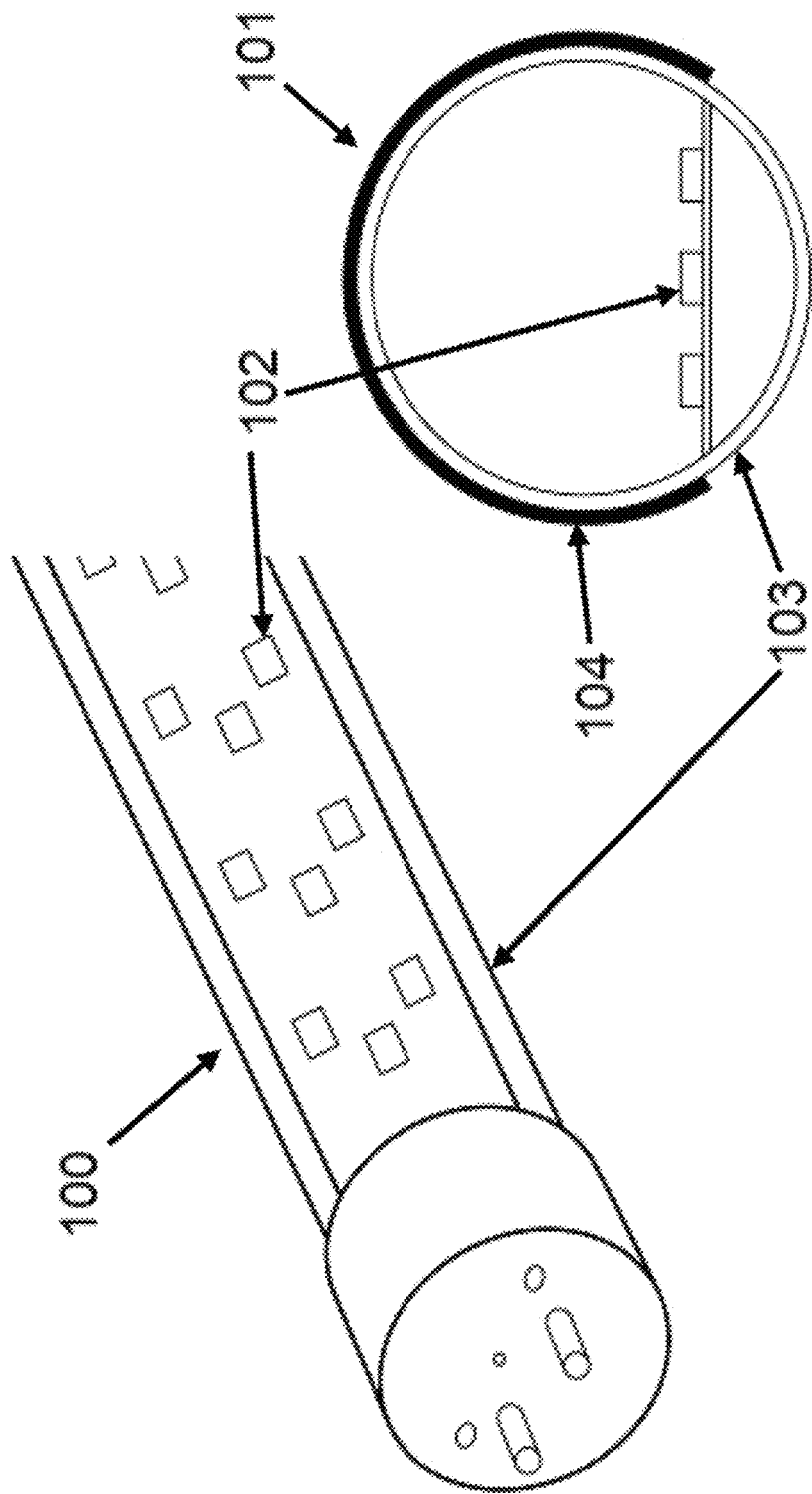
FIG. 4 schematically depicts a diagram of an LED tubular lamp and its cross-section, showing that the lens of the tubular lamp is coated with an anti-bacterial composite film of photocatalytic particles and nano silver particles.

FIG. 4 is an embodiment of the lighting apparatus of the present disclosure in a form of an LED tubular lamp 100. The cross-section view 101 shows that the multiple LED light sources 102 is completed enclosed by one circular lens 103, and an anti-bacterial composite film 104 comprised of photocatalytic particles and nano silver particles is formed on the majority part of the outer surface of the lens 103. The anti-bacterial composite film 104 could cover the entire outer surface of the lens to maximize the anti-bacteria effect. Alternatively, the lens 103 may cover only the section above the LED PCB board and a heat-sink, connected with the lens 103, may cover the section below the LED PCB board. The material of the lens 103 can be plastic, polycarbonate, glass, or any transparent or translucent material with good light transmittance. Any lamp with any form factor can be coated with an anti-bacterial composite film of photocatalytic particles and nano silver particles on its lens, but the antibacterial effectiveness is better for a lamp with a larger lens area coated with an anti-bacterial composite film than one with a smaller lens area coated with an anti-bacterial composite film.

Figure 5:
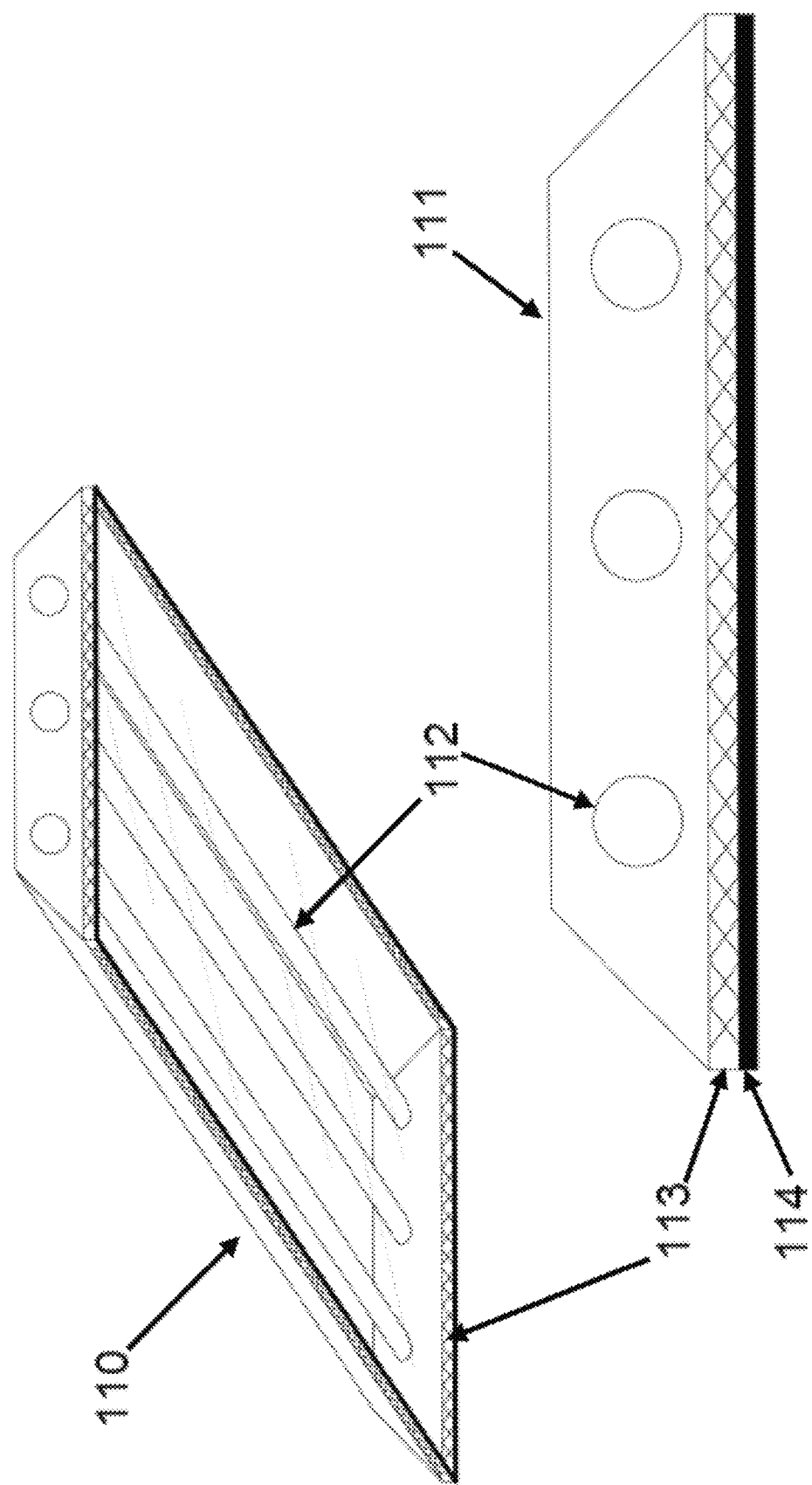
FIG. 5 schematically depicts a diagram of a linear troffer fixture and its cross-section, showing that the prismatic lens of the fixture is coated with an anti-bacterial composite film of photocatalytic particles and nano silver particles.

FIG. 5 is another embodiment of the lighting apparatus of the present disclosure in the form for a linear troffer luminaire 110. The cross-section view 111 shows that the fluorescent tubular lamps as the light sources 112 is completed enclosed by a prismatic lens 113, and an anti-bacterial composite film 114 comprised of photocatalytic particles and nano silver particles is formed on the entire outer surface of the lens 113. Any general lighting luminaire with any form factor can be coated with an anti-bacterial composite film of photocatalytic particles and nano silver particles on its lens, but the anti-bacterial effectiveness is greater for a luminaire with a larger lens area coated with an anti-bacterial composite film than one with a smaller lens area coated with an anti-bacterial composite film.

Figure 6:
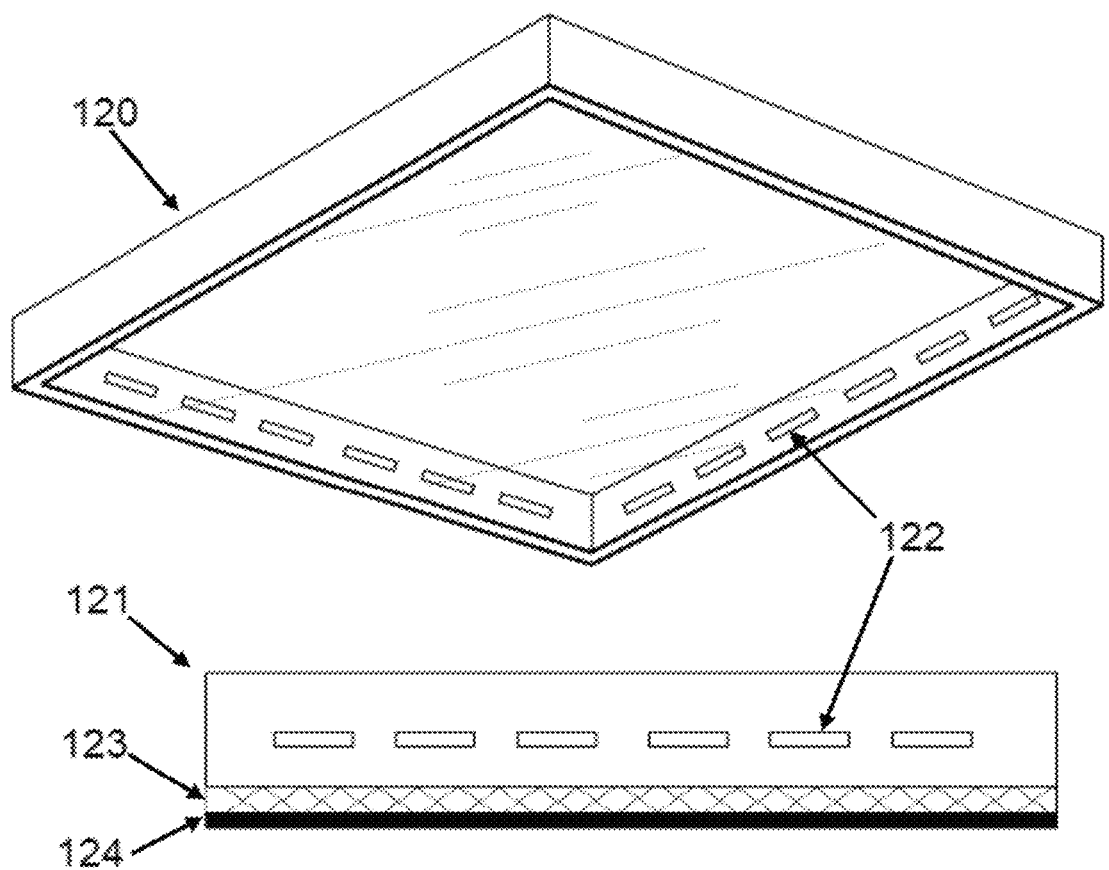
FIG. 6 schematically depicts a diagram of an LED panel light fixture and its cross-section, showing that the lens of the panel light fixture is coated with an anti-bacterial composite film of photocatalytic particles and nano silver particles.

FIG. 6 is yet another embodiment of the lighting apparatus of the present disclosure in a form of a panel light luminaire 120. The cross-section view 121 shows that the LED light source is enclosed by a flat panel lens 123, and an anti-bacterial composite film 124 comprised of photocatalytic particles and nano silver particles is formed on the entire outer surface of the lens 123. The panel light 120 differs from the linear troffer 110 in that the multiple light sources 122 are on the inside edge of the panel light luminaire 120, rather than directly above the lens 113 as in the case of the linear troffer 110. The line sources 122 are nonetheless partially enclosed by the lens 123, thus meeting the condition of the present disclosure.

The lighting sources in the three example embodiments above can be any artificial light source meeting the requirement of having a less than 5% UV spectral power such that the lighting apparatus can be used as a general lighting device for a long duration without causing any physical harm to the users.

ADDITIONAL AND ALTERNATIVE
IMPLEMENTATION NOTES

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A lighting apparatus, comprising of:
at least one light source;
at least one lens that is transparent or translucent; and
at least one anti-bacterial composite film,
wherein:
the at least one light source is enclosed at least partially by the at least one lens,
the at least one anti-bacterial composite film comprises photocatalytic particles and nano silver particles,
the at least one anti-bacterial composite film is formed on at least a part of an outer surface of the at least one lens, and
at least 95%, of a spectral power distribution (SPD) of the at least one light source is in a visible light wavelength range greater than 400 nm.

2. The lighting apparatus of claim 1, wherein the photocatalytic particles comprise rhombus-shape anatase-type titanium dioxide ($TiO_2$).

3. The lighting apparatus of claim 1, wherein the at least one light source comprises a light emitting diode (LED).

4. The lighting apparatus of claim 1, wherein a thickness of the anti-bacterial composite film is less than 200 nm.

5. The lighting apparatus of claim 1, wherein an overall light transmittance of the anti-bacterial composite film is greater than 90%.

* * * * *